United States Patent

Metro

[15] 3,685,095
[45] Aug. 22, 1972

[54] LOIN PULLER
[72] Inventor: Fill Metro, Winnipeg, Manitoba, Canada
[73] Assignee: Canada Packers Limited, Ontario, Canada
[22] Filed: April 16, 1970
[21] Appl. No.: 29,099

[52] U.S. Cl. ..................................................17/1
[51] Int. Cl. ...........................................A22c 17/00
[58] Field of Search ..........................17/1 R, 1 G, 23

[56] References Cited

UNITED STATES PATENTS 3,546,737  4/1968  Neebel et al. ................17/1 R
3,159,869  12/1964  Vogt et al. ....................17/1 R
3,553,766  1/1971  Herubel ........................17/1 G

*Primary Examiner*—Lucie H. Laudenslager
*Attorney*—Kent & Ade

[57] ABSTRACT

The pork loin is placed fat side down on a bed and a hold-down device is lowered to clamp the loin in position. An arcuately curved knife is pulled through the loin between the meat and the fat thus severing the layer of back fat. At the end of the knife stroke the bed is released and swings downwardly thus dropping the loin and the fat onto a conveyor therebelow. The hold-down raises and returns the bed to the closed position whereupon the knife returns to the starting position.

12 Claims, 6 Drawing Figures

INVENTOR.
METRO FILL
BY Kent & Ade

INVENTOR
METRO FILL

3,685,095

1
LOIN PULLER

This invention relates to new and useful improvements in loin pulling devices, particularly devices adapted for use in the processing of pork.

It is well known that loins of pork are normally provided with a relatively thick layer of back fat and it is conventional to trim the majority of this fat from the loin during the meat processing and prior to the loin reaching the market.

Loin pulling devices exist but they are relatively cumbersome and also they are slow in operation. Furthermore, each loin is usually provided with a different thickness of fat and it is desirable, for marketing purposes, to retain a standard thickness of fat upon the meat of the loin.

It therefore follows that the knife and/or the loin itself has to be adjusted before the knife is pulled through the fat to sever same from the loin.

The present device consists of a loin receiving bed upon which the loin is placed fat side down. A clamping device holds the loin firmly in position and the bed may be adjusted within limits depending upon the thickness of fat present on the particular loin being treated. An arcuately curved knife is then drawn through the fat longitudinally by pneumatic pressure and at the end of the knife stroke, a catch is released so that the bed swings downwardly depositing the loin and the severed fat upon a conveyor therebelow. The hold-down device then raises to the uppermost position at the same time lifting the cradle to the closed position whereupon the knife may return to the beginning of the stroke.

With the exception of the adjustment of the height of the loin receiving bed, the remaining actions are initiated by pneumatic pressure and sequence valves permit practically an automatic operation to take place.

It has been found that the removal of the fat from loins can be speeded up so that the device can be installed in regular line production assemblies.

The principal object and essence of the invention is to provide a device of the character herewithin described in which the back fat is separated from the loin and which furthermore enables the operator to retain a relatively standard thickness of fat upon the loin irrespective of the original thickness of fat.

Another object of the invention is to provide a device of the character herewithin described in which the bed automatically opens after the cut has been made thus removing the loin and the fat from the machine and returning the machine to the position ready to receive the next loin.

Another object of the invention is to provide a device of the character herewithin described which is relatively simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying figures in which:

2

In the drawings like characters of reference indicate corresponding parts in the different figures.

Figure 1:
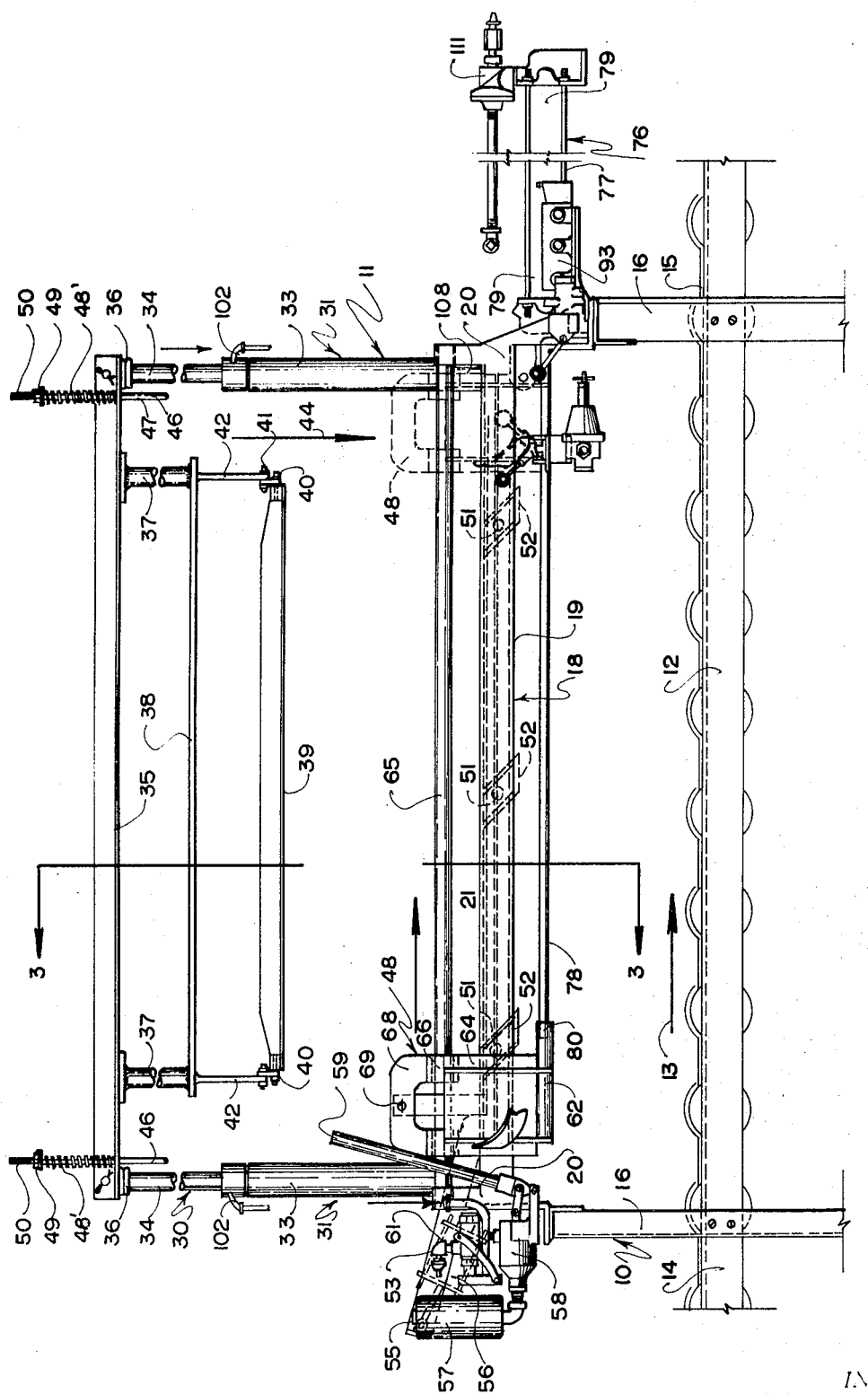
FIG. 1 is a side elevation of the device with the hold-down device raised.

Proceeding therefore to describe the invention in detail, reference character 10 illustrates generally supporting structure, supporting the device collectively designated 11 above a travelling conveyor shown schematically at 12. The conveyor 12 normally moves in the direction of arrow 13 so that loins to be treated approach from the end 14, are placed upon the machine 11 by hand, and are dropped back upon the conveyor 12 to leave by the end 15 as will described.

The supporting structure 10 includes vertical members 16 which in turn support transverse members 17 upon which the machine is mounted. A loin receiving bed collectively designated 18 includes a pair of spaced and parallel longitudinal supporting members 19 extending between end castings or brackets 20.

A pivot rod 21 is supported by one of the longitudinal members 19 and an arcuately curved loin receiving plate 22 is pivoted by one edge thereof to this pivot rod 21.

The plate is normally maintained in the position shown in full line in FIG. 3 by a latch mechanism collectively designated 23 and this latch mechanism is actuated, as will hereinafter be described, so that the plate can swing downwardly to the position shown in phantom in FIG. 3, the movement being indicated by arrow 24.

Figure 4:
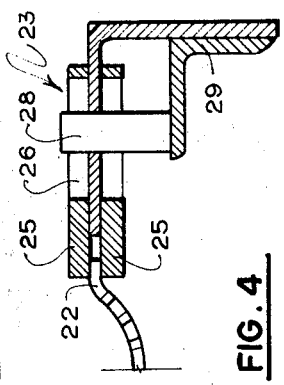
FIG. 4 is an enlarged fragmentary sectional view of the loin receiving bed release means.

The latch mechanism 23 includes a pair of spaced and parallel plates 25 having diagonal slots 26 formed therethrough by which the plates are mounted for movement in a direction of the double headed arrow 27, upon mounting pins 28 extending upwardly from a support bracket 29, details of which are shown in FIG. 4.

When in the closed position, the loin receiving plate is engaged by the distal edge or side 29 thereof between plates 25 but when plates 25 are moved outwardly and away, the edge is disengaged from between the plates and gravity causes the loin receiving plate to swing downwardly as hereinbefore described. Details of the actuation of the latch mechanism together with the return mechanism for the plate 22 will be described later.

A pork loin hold-down component collectively designated 30 consists of a pair of spaced and parallel vertically situated fluid operated piston and cylinder assemblies 31 supported at the bases thereof between brackets 32 situated at each end of the supporting framework and being secured to the cross members 17.

Each assembly includes a stationary cylinder 33 and a reciprocating piston rod 34 therein.

A member 35 spans the upper ends 36 of the two piston rods and is secured thereto and stanchions 37 extend downwardly from member 35 in spaced and parallel relationship and are braced by a further supporting member 38 extending therebetween as clearly shown in FIG. 1.

Figure 2:
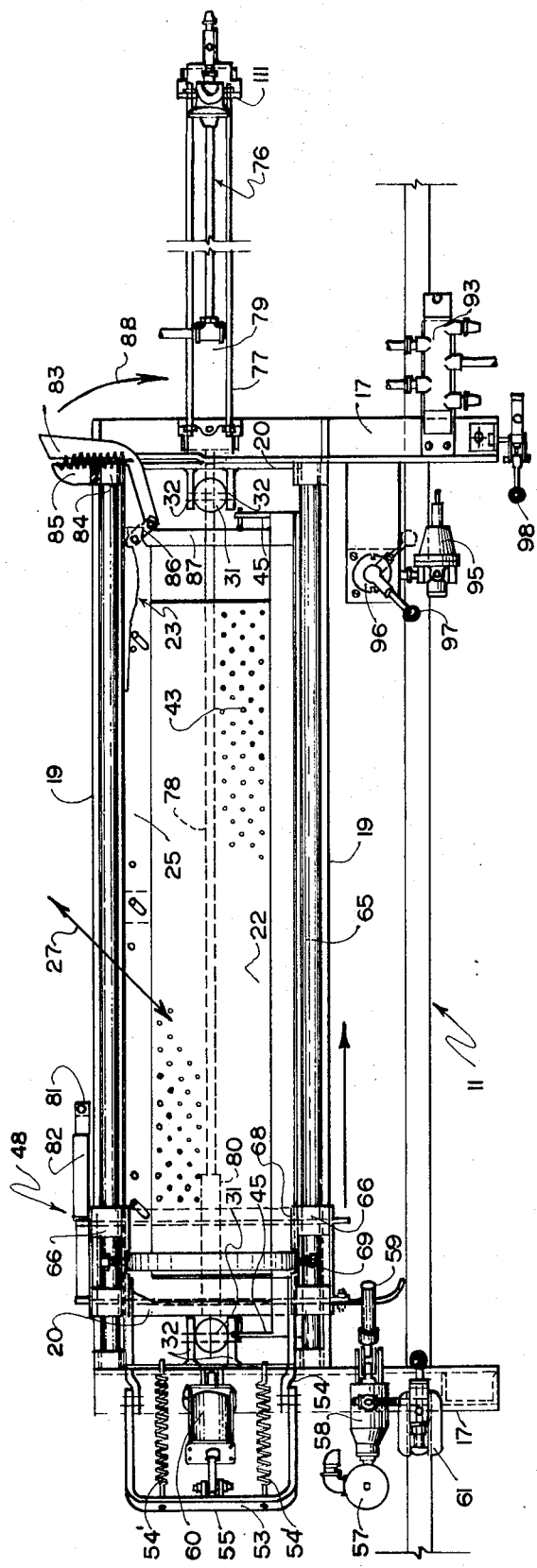
FIG. 2 is a top plan view of FIG. 1 with the hold-down component removed for clarity.

A pair of hold-down plates 39 are secured in spaced and parallel longitudinal relationship upon end brackets 40 and these two end brackets are in turn pivotally supported by pivot pins 41 upon the lower ends of brackets 42 secured to and extending downwardly from the aforementioned stanchions 37. These plates 39 are perforated by apertures being punched through the plates so that the downwardly projecting edges of the walls bounding the perforations act as gripping teeth to hold the loin firmly in position. Reference character 43 in FIG. 2 illustrates these perforations although an enlarged view is not shown as it is believed that this type of structure is conventional.

Figure 3:
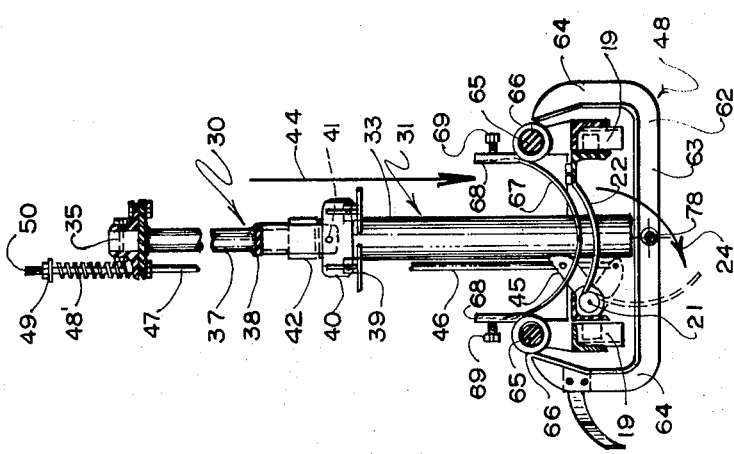
FIG. 3 is a sectional view substantially along the line 3—3 of FIG. 1.

The hold-down device illustrated in FIGS. 1 and 3 is shown in the released position or the uppermost position and it can be moved from this position downwardly in the direction of arrow 44 as will hereinafter be described.

A pair of links or levers 45 are secured to the ends of the loin receiving plate 22 although only one is shown in the accompanying drawings in FIG. 3. These links are secured to the edge of the plate upon which it is pivotally mounted upon pivot rods 21 and a rod 46 is pivotally secured by the lower end thereof to each of these links and extends upwardly parallel to and adjacent to the aforementioned piston and cylinder assemblies 11 forming part of the hold-down device. The upper ends 47 of these rods pass freely through apertures in member 35 and a compression spring 48' surrounds the portion of the rods above member 35 adjustment of these springs being provided by means of nut 49 screw threadably engaged the portions 50 of the rods above member 35.

When the hold-down device moves to the lowermost or loin clamping position as will hereinafter be described, member 35 slides down the rods 46 which are then free to move downwardly as soon as the plate 22 is released and swings to the position shown in phantom in FIG. 3. However, when the hold-down component moves upwardly back to the position shown in FIGS. 1 and 3, then the member 35 engages the underside of springs 48' and compresses same until it lifts the rods 46 upwardly and this upward movement of the rods 46 causes the plate 22 to be moved upwardly into the latched position shown in full line in FIG. 3.

Referring back to the loin receiving bed 18, means are provided to permit limited vertical adjustment of this bed relative to a knife component collectively designated 48 and which will hereinafter be described.

The side members 19 forming the supports for the bed are journalled for movement upon pairs of mounting pins shown in phantom in FIG. 1 and identified by the reference character 51. These guide pins extend from the supporting framework of the machine and engage within inclined guideways 52 formed in the side members 19 of the loin receiving bed.

Means are provided to move the bed in an inclined direction parallel to the guideways 52 so that vertical adjustment between the bed and the knife component 48 is provided and in this regard I have formed an inclined actuating frame 53 upon the ends 54 of members extending from the ends of the side members 19 and reference should be made to FIG. 2 in this regard.

This frame 53 is substantially U-shaped and is provided with a pair of tension springs 54' extending between the cross member 55 of this frame and one of the transverse members 17 so that the springs normally maintain the loin receiving bed in the lowermost position. However, a manually operated hydraulic piston and cylinder assembly 56 is pivotally mounted between the cross member 55 of the framework 53 and the transverse supports 17 so that it extension of this piston and cylinder assembly moves the frame upwardly upon the guide pins 51 thus raising the frame relative to the knife component.

The reason for this adjustment is so that the operator can adjust the bed together with the loin thereon so that a standard amount of fat is left upon the loin after operation of the knife component.

Figure 6:
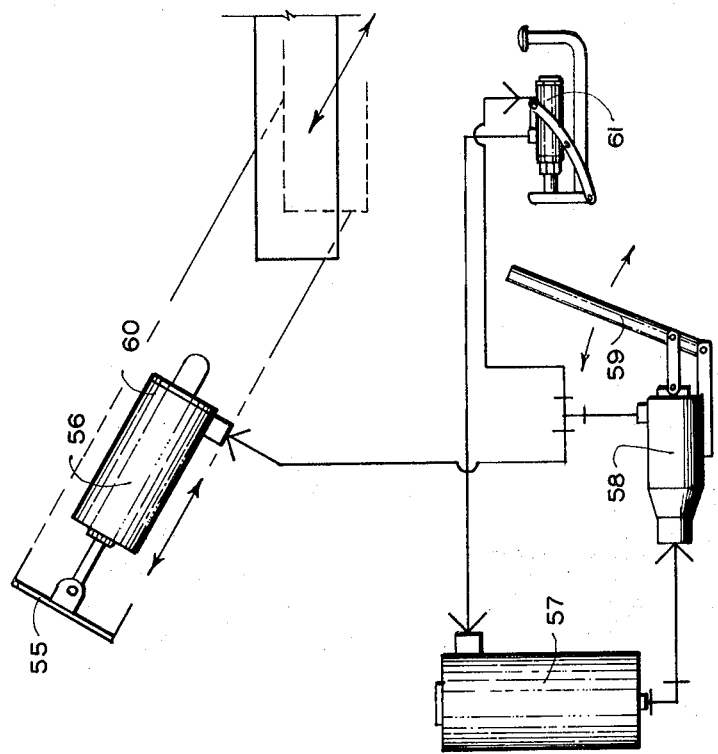
FIG. 6 is a schematic view of the hydraulic system.

FIG. 6 shows schematically the details of this hydraulic circuit.

An oil reservoir 57 is connected to a hand operated hydraulic pump 58 operated by a lever 59. Operation of the lever forces oil under pressure into one end 60 of the piston and cylinder assembly 56 thus extending the ram (not illustrated) connected to the cross member 55 of the frame 53. A release valve assembly 61 is also connected within the lines so that pressure can be relieved when it is desired to lower the bed, springs 54' moving the bed downwardly to the required amount. The conduits are shown schematically and are believed to be self evident.

The aforementioned knife component 48 consists of a cradle 62 which includes a transverse member 63 extending between the substantially vertical side members 64 and this cradle extends under the loin receiving bed 18.

Situated above the bed are a pair of spaced and parallel guide rails 65 secured to and extending between the end castings or brackets 20 and bearing sleeves 66, formed on the upper ends of the side members 64 of the cradle, embrace these guide rails so that the cradle can be reciprocated horizontally therealong.

An arcuately curved concavo-convex knife blade 67 is clamped by the ends thereof between clamping members 68 extending upwardly from the bearing sleeves 66, clamping screws 69 holding the blade firmly in position.

Means are provided to reciprocate the knife component 48 and take the form of a pneumatically operated piston and cylinder assembly collectively designated 70. This is supported between rods 77 extending from one end of the machine and the relatively long piston rod 78 extending from the cylinder 79, is secured to the transverse member 63 of the cradle 62 as indicated by reference character 80.

This piston and cylinder assembly 76, moves the knife component from the position shown in FIGS. 1 and 2, to the position shown in phantom in FIG. 1 and then returns the component back to the original position.

As the knife component reaches the position shown in phantom, a roller 81 mounted upon a bracket 82 extending from one side of the cradle, strikes a curved lever 83 held normally in the position shown in FIG. 2, by means of a spring 84 extending between the lever and a support 85.

This lever is pivoted upon a pin 86 within the supporting structure and an extending end 87 of this lever is connected to the uppermost of one of the plates 25 forming part of the latch mechanism 23. The lever 83 moving in the direction of arrow 88, causes the plates 25 to move in the direction of arrow 27 upon the mounting pins 28 thus releasing the plate 22 of the loin receiving bed and holding the latch mechanism in the open position until the hold-down component has moved back to its original position thus bringing the plate 22 back to the closed position whereupon the knife component moves back to its original position thus releasing the lever 83 and permitting spring 84 to engage the plates 25 with the edge 29 of the loin receiving plate 22.

Before describing the pneumatic circuitry, the sequence of operations will be given.

With the device in the position shown in FIG. 1, the operator picks up a loin from the conveyor 12 and places it fat side down upon the loin receiving plate 22.

The operator then adjusts the relative height of the loin receiving bed by means of the hydraulic pump 58 actuating the piston and cylinder assembly 56 as he gauges the thickness of fat to be removed. The hold-down device is then moved downwardly into clamping position upon the loin, the pivotal action of the hold-down plate 39 facilitating this clamping engagement.

The knife component 48 is then moved to the opposite side of the device to take up the position shown in phantom in FIG. 1, the arcuately curved knife blade 45 severing a layer of fat from the loin inasmuch as this knife blade passes through the fat a spaced distance from the meat of the loin.

As the knife component 48 reaches the end of its travel, it actuates the latch mechanism 23 thus withdrawing the plates 25 from the edge of the loin receiving plate 22. The weight of the loin causes this plate to swing downwardly depositing the loin and the layer of severed fat back upon the conveyor 12 whereupon it moves along the conveyor towards the end 15 thereof.

The hold-down device then raises to its original position closing the loin receiving plate 22 at which time the knife component 48 returns to its original position thus releasing the latch mechanism and permitting same to engage the edge of the plate 22 and hold same in the closed position.

It will be appreciated that the knife component has to be in the position shown in phantom in FIG. 1 clear of the swing down plate 22 so that the plate can swing downwardly without the cradle 62 of the knife component interfering with this downwardly and upwardly swinging motion.

Figure 5:
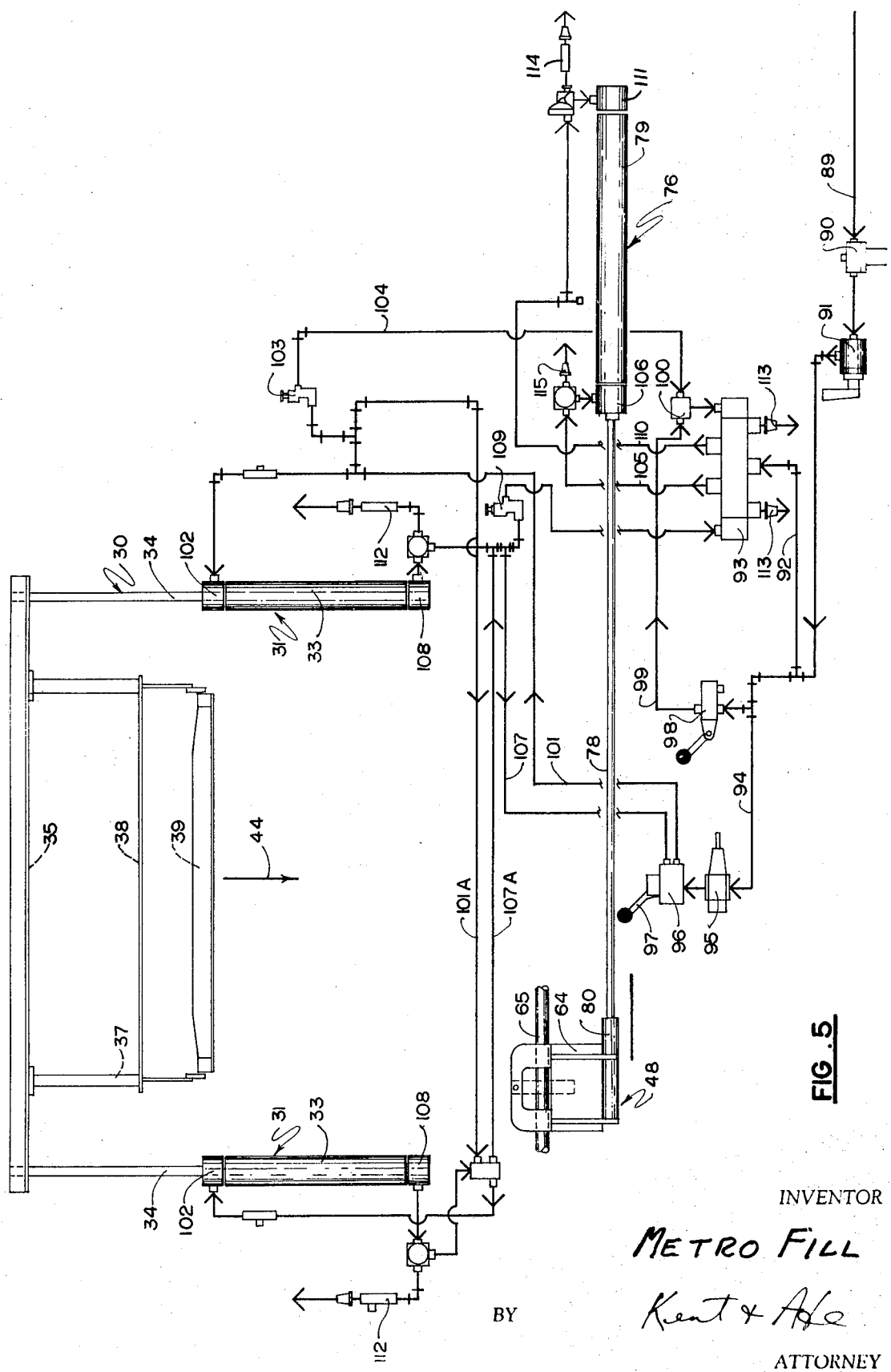
FIG. 5 is a schematic view of the pneumatic system.

FIG. 5 shows a schematic diagram of the pneumatic circuitry and although air is the preferred medium, nevertheless it will be appreciated that hydraulics could be used.

The air pressure is supplied from a source (not illustrated) through line 89, through a lubricator 90, to a main supply valve 91. From there it is routed via conduit 92, to an automatically operated reciprocating shuttle valve 93 which is conventional in construction.

A line 94 extends to a pressure reducer 95 and then to the main operating valve 96 which is four-way valve operated by lever 97. A main valve 98 is situated within a conduit or line 99 extend from line 94 to the shuttle valve control 100.

When the loin is placed in position, the valve 97 is operated to connect air via line or conduit 101 and 101A to the upper ends 102 of the cylinders 33. This causes the hold-down device to move to the loin clamping position and when it is so clamped, pressure built up in the line until a sequence valve 103 is operated thus allowing air to pass through conduit or line 104 and to operate the shuttle valve 93 via control 100. The shuttle valve at this point, connects air from line 92 to line 105 which in turn connects to the end 106 of the knife component cylinder 79. This causes rod 78 to move to the right with respect to the drawings thus moving the knife component towards the position shown in phantom in FIG. 1.

After the knife has made its stroke and the loin has been dropped upon the conveyor by the opening of the loin receiving plate 22, valve 97 is moved to the other position which routes air through line 107. This line, together with line 107A, supplies air to the lower ends 108 of the cylinders 33 thus raising the hold-down device and lifting the plates 22 to the closed position.

Once again pressure build up occurs and operates sequence valve 109 which actuates the shuttle valve 93 thus causing air to move from line 92 through line 110 to the other end 111 of the cylinder 79 thus extending piston rod 78 and moving the knife component back to the original position ready for the next sequence of operation.

The necessary exhaust valving 112, 113, 114 and 115 are provided in the usual manner and are conventional in construction and operation.

The use of this device enables pork loins to be stripped of their fat rapidly and easily particularly when situated within a moving conveyor system and furthermore the adjustment of the loin receiving plate enables the operator to adjust the device so that a standard layer of fat is left upon the pork loin after the pulling operation thus leading to a standardization of product which is desirable in packing house operations.

Various modifications can be made within the scope of the inventive concept which is herein disclosed and/or claimed.

What I claim as my invention is:

1. A device for separating a layer of fat from a pork loin comprising in combination, supporting framework, a loin receiving bed hingedly supported by one side thereof to said framework, latch means on said framework to detachably hold said bed in the closed position, a hold-down component on said framework and above said bed movable from between a released position and a loin clamping position, an arcuately curved knife component mounted on said framework above said bed, and means to move said knife component from one end of said bed to the other and to return said knife to said one end, said knife component including a pair of spaced and parallel substantially horizontally situated guide rails on said supporting framework, a cradle journalled for longitudinal movement on said rails, an arcuately curved knife blade mounted in said cradle, said means to move said knife component including a fluid operated piston and cylinder component supported by said framework, the piston rod of said piston and cylinder component being secured to said cradle.

2. The device according to claim 1 which includes means to adjust the relative height of said loin receiving bed within limits, with reference to said knife component.

3. The device according to claim 2 in which said loin receiving bed includes a pair of longitudinally extending spaced and parallel supports and an arcuately curved loin receiving plate between said supports and being hingedly secured by one edge thereof to one of said supports, said means to adjust the relative height of said loin receiving bed including a plurality of inclined guideways on said supporting framework, mounting means extending between said longitudinal supports and said guideways, an inclined actuating frame extending from one end of said supports, and a fluid operated piston and cylinder assembly extending at an inclined angle from the horizontal between said frame and said supporting structure whereby extension of said piston and cylinder assembly moves said bed upwardly along said guides and vice versa.

4. The device according to claim 3 in which said hold-down component includes a pair of spaced and parallel substantially vertically situated, fluid operated piston, piston rod and cylinder assemblies extending upwardly from said supporting framework and a loin engaging and gripping plate pivotally secured by the ends thereof to the piston rods of said last mentioned piston and cylinder assemblies.

5. The device according to claim 4 which includes linkage means extending between said hold-down component and said hinged bed to move said bed to the raised position when said hold-down component moves to the released position.

6. The device according to claim 5 in which said last mentioned means includes a link extending from each end of said loin receiving plate, rods extending upwardly from the ends of said link, said rods being operatively connected to said hold-down device.

7. The device according to claim 2 in which said hold-down component includes a pair of spaced and parallel substantially vertically situated, fluid operated piston, piston rod and cylinder assemblies extending upwardly from said supporting framework and a loin engaging and gripping plate pivotally secured by the ends thereof to the piston rods of said last mentioned piston and cylinder assemblies.

8. The device according to claim 7 which includes linkage means extending between said hold-down component and said hinged bed to move said bed to the raised position when said hold-down component moves to the released position.

9. The device according to claim 8 in which said last mentioned means includes a link extending from each end of said loin receiving plate, rods extending upwardly from the ends of said link, said rods being operatively connected to said hold-down device.

10. The device according to claim 1 in which said hold-down component includes a pair of spaced and parallel substantially vertically situated, fluid operated piston, piston rod and cylinder assemblies extending upwardly from said supporting framework and a loin engaging and gripping plate pivotally secured by the ends thereof to the piston rods of said last mentioned piston and cylinder assemblies.

11. The device according to claim 10 which includes linkage means extending between said hold-down component and said hinged bed to move said bed to the raised position when said hold-down component moves to the released position.

12. The device according to claim 11 in which said last mentioned means includes a link extending from each end of said loin receiving plate, rods extending upwardly from the ends of said link, said rods being operatively connected to said hold-down device.

* * * * *